US011448052B2

(12) United States Patent
Alkhalaf et al.

(10) Patent No.: US 11,448,052 B2
(45) Date of Patent: Sep. 20, 2022

(54) CEMENT AND ANTI-CORROSION FLUID FOR CASING ISOLATION

(71) Applicant: SAUDI ARABIAN OIL COMPANY, Dhahran (SA)

(72) Inventors: Sara A. Alkhalaf, Alkhobar (SA); Bandar AlMalki, Dhahran (SA); Chinthaka Gooneratne, Dhahran (SA); Abdullah Al-Yami, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/903,796

(22) Filed: Jun. 17, 2020

(65) Prior Publication Data

US 2021/0396108 A1 Dec. 23, 2021

(51) Int. Cl.
*E21B 43/16* (2006.01)
*C09K 8/467* (2006.01)

(52) U.S. Cl.
CPC ............ *E21B 43/162* (2013.01); *C09K 8/467* (2013.01)

(58) Field of Classification Search
CPC .............................. E21B 43/162; C09K 8/467
See application file for complete search history.

(56) References Cited

U.S. PATENT DOCUMENTS

| 2,761,843 A | 9/1956 | Brown |
| 3,638,730 A * | 2/1972 | Smith .................... E21B 33/16 166/291 |
| 4,012,264 A | 3/1977 | Murray et al. |
| 4,257,814 A | 3/1981 | Kellet et al. |
| 4,373,956 A | 2/1983 | Rosskopf |

(Continued)

FOREIGN PATENT DOCUMENTS

| CA | 3042913 A1 | 9/2019 |
| CN | 102977871 A | 3/2013 |

(Continued)

OTHER PUBLICATIONS

International Search Report and Written Opinion issued in corresponding International Patent Application No. PCT/US2020/045385, dated Feb. 17, 2021 (14 pages).

(Continued)

*Primary Examiner* — Silvana C Runyan
(74) *Attorney, Agent, or Firm* — Osha Bergman Watanabe & Burton LLP

(57) ABSTRACT

A method for cementing a wellbore, including pumping a volume of an anti-corrosion fluid comprising at least one corrosion inhibitor into a casing and displacing the anti-corrosion fluid into an annular space outside the casing with a volume of cement. A displacement fluid may then be injected into the casing to displace the cement into the annular space, wherein a combined volume of cement and anti-corrosion fluid fills the annular space along a height of the casing. A height of the cemented annular space may be less than the height of the casing, the anti-corrosion fluid being retained in the annular space axially above a cemented annular space, forming an anti-corrosion fluid annular space. Partially cementing in this manner may simultaneously protect the casing from corrosion while allowing easier workover operations proximate the anti-corrosion fluid annular space.

19 Claims, 13 Drawing Sheets

(56) References Cited

U.S. PATENT DOCUMENTS

| | | |
|---|---|---|
| 4,481,037 A | 11/1984 | Beale et al. |
| 4,493,771 A | 1/1985 | Wilson et al. |
| 4,515,708 A | 5/1985 | Haslegrave et al. |
| 5,057,467 A | 10/1991 | Croft |
| 5,450,900 A | 9/1995 | Schalla et al. |
| 5,641,385 A | 6/1997 | Croft et al. |
| 5,866,517 A * | 2/1999 | Carpenter ............... C09K 8/424 507/226 |
| 6,153,049 A | 11/2000 | Croft |
| 6,196,320 B1 * | 3/2001 | Ray ........................ C09K 8/52 166/270.1 |
| 6,312,560 B1 | 11/2001 | Croft |
| 6,723,163 B1 | 4/2004 | Hofmann |
| 7,617,870 B1 | 11/2009 | Roddy et al. |
| 7,863,228 B2 | 1/2011 | Loper et al. |
| 9,434,911 B2 | 9/2016 | Bennett et al. |
| 9,617,185 B2 | 4/2017 | Ferrari et al. |
| 9,850,419 B2 | 12/2017 | Ballew et al. |
| 10,259,983 B2 | 4/2019 | Galindo et al. |
| 2011/0071059 A1 * | 3/2011 | Nguyen ................ C10G 33/04 507/243 |
| 2013/0261032 A1 | 10/2013 | Ladva et al. |
| 2015/0299552 A1 | 10/2015 | Zamora et al. |
| 2016/0208158 A1 | 7/2016 | Monahan et al. |
| 2016/0264838 A1 * | 9/2016 | Nelson .................... C04B 28/02 |
| 2017/0313926 A1 * | 11/2017 | Morgan ................. E21B 33/13 |

FOREIGN PATENT DOCUMENTS

| | | |
|---|---|---|
| CN | 105238378 A | 1/2016 |
| CN | 107557788 A | 1/2018 |
| GB | 895702 A | 5/1962 |
| GB | 1109594 A | 4/1968 |
| IN | 201611011505 A | 10/2017 |
| RU | 223385 C2 | 2/2004 |
| WO | 2016/010520 A1 | 1/2016 |

OTHER PUBLICATIONS

Houska, Catherine, "Deicing Salt—Recognizing the Corrosion Threat", International Molybdenum Association, Released 2009, Access date: Jun. 16, 2020, URL: <https://www.imoa.info/download_files/stainless-steel/DeicingSalt.pdf> (11 pages).

Rihan, Rihan et al., "The Effect of Two Amine-Based Corrosion Inhibitors in Improving the Corrosion Resistance of Carbon Steel in Sea Water", Journal of Materials Engineering and Performance, ASM International, vol. 23(3), Mar. 2014, pp. 693-699 (7 pages).

* cited by examiner

CEMENT AND ANTI-CORROSION FLUID FOR CASING ISOLATION

FIELD OF THE DISCLOSURE

Embodiments herein relate generally to a method for partially cementing a casing for use in oil and gas drilling.

BACKGROUND

Corrosion may be defined as the gradual loss of weight of metal elements via some chemical process or series of chemical reactions. Corrosion is a natural process that involves the weakening and degradation of metal components due to an electrochemical reaction.

The most common type of corrosion, atmospheric corrosion, occurs when metals like iron and/or steel contact acidic substances including water and salty water. The resulting electrochemical reaction causes corrosion products such as rust to form.

One of the most significant corrosive components are salts, like sodium chloride (NaCl), calcium chloride ($CaCl_2$)), and magnesium chloride ($MgCl_2$). Salts impact corrosion rates in several ways. First, salts are hygroscopic, meaning they absorb water from the air. Once they have absorbed water, the salts are conductive and can carry a current, which speeds up the corrosion process. Additionally, the chloride ions (Cr) in salts can break down the protective oxide layer on the metal, which will make the rust reaction faster and easier.

The economic costs of corrosion are extremely high, with large sums spent on corrosion prevention and replacement of corroded materials. The use of more corrosion-resistant metals (e.g. Ti, Cr, Ni) is one way to improve corrosion resistance. However, these metals are much more expensive than steel, are difficult to process and manufacture, and are still susceptible to corrosion at connection points such as welds.

Turning to the geometry of an oil well, conventionally when a wellbore is created, a number of casings are installed in the borehole to prevent collapse of the borehole wall and to prevent undesired outflow of drilling fluid into the formation or inflow of fluid from the formation into the borehole. The borehole is drilled in intervals whereby a casing which is to be installed in a lower borehole interval is lowered through a previously installed casing of an upper borehole interval. As a consequence of this procedure, the casing of the lower interval has a smaller diameter than the casing of the upper interval. Thus, the casings are in a nested arrangement with casing diameters decreasing in the downward direction.

Consider the well depicted in FIG. 1. Conventionally, at the surface 103 end of the wellbore, a wellhead 101 is formed that may include a conductor casing 117, a surface casing 115, a number of production and/or drilling casings 113, 111, valving 107, and a Christmas tree (not depicted). Typically, the wellhead 101 includes a concentric arrangement of smaller casings which may include a production casing 111 and one or more intermediate casings 113. Listed from smallest to largest diameter, the concentric casings of an oil well may include the production casing 111, one or more intermediate casings 113 (FIG. 1 includes two intermediate casings), the surface casing 115, and the conductor casing 117. Production casing 111 and borehole 130 ends within or below formation 105 from which oil and/or gas is to be extracted.

In cementation of oil wells, cement is pumped down into a casing and back up the annular space outside of the casing. These annular spaces may be between two concentric casings and/or between a casing and the borehole. The most important purposes of the cementing process are to prevent transport of gas and liquid between subterranean formations; to tie up and support the casing pipe; to protect the casing against shockloads; to prevent gas- or oil-blow-outs, and to protect the casing from corrosion.

Some cemented annular spaces are disposed between the outer surfaces of the casings and the borehole wall to seal the casings from the borehole wall. One example of this is cemented annular space 171 between borehole 130 and production casing 111. Furthermore, some cemented annular spaces are disposed between the outer surfaces of a smaller diameter casing and the inner surface of the next largest casing. One example of this is cemented annular space 177 between conductor casing 117 and surface casing 115. Note, the lower reaches of cemented annular space 177 around surface casing 115 is bounded on the outside by a larger diameter section of borehole 130 and not by conductor casing 117. Similarly, cemented annular space 173 is largely between the two intermediate casings 113; cemented annular space 175 is largely between the larger intermediate casing 113 and surface casing 115; and cemented annular space 179 is between conductor casing 117 and the largest diameter portion of borehole 130.

SUMMARY OF DISCLOSURE

In one aspect, embodiments herein are directed toward a method for cementing a wellbore. The method may include pumping a volume of an anti-corrosion fluid comprising at least one corrosion inhibitor into a casing and displacing the anti-corrosion fluid into an annular space outside the casing with a volume of cement. A displacement fluid may then be injected into the casing to displace the cement into the annular space, wherein a combined volume of cement and anti-corrosion fluid fills the annular space along a height of the casing. A height of the cemented annular space may be less than the height of the casing, the anti-corrosion fluid being retained in the annular space axially above a cemented annular space, forming an anti-corrosion fluid annular space.

In some embodiments, the casing may include stage cementing shoes or multi-stage tools permitting staged cementing of the annular space. Embodiments herein may include injecting anti-corrosion fluid and/or cement at a location via a multi-stage tool. Such embodiments may result in multiple annular regions containing cement and multiple annular regions containing anti-corrosion fluid.

In another aspect, embodiments herein are directed toward a method to workover a wellbore. The method may include partially cementing a wellbore to have one or more annular regions being filled with anti-corrosion fluid, as described above, and then, when workover is desired, casing punching at an axial height proximate a location where anti-corrosion fluid is retained in the annular space. Remedial fluids may then be into the annular space via the punched casing.

In another aspect, embodiments herein are directed toward a well system comprising a partially cemented casing formed by the partial cementing methods described above, resulting in the annular space outside the casing comprising one or multiple zones comprising cement and one or multiple zones comprising anti-corrosion fluid. A cumulative height of a cemented annular space plus a cumulative height of an anti-corrosion fluid annular space is approximately equivalent to a height of a casing.

In another aspect, embodiments herein are directed toward a method of cementing a wellbore. The method may include pumping a volume of an anti-corrosion fluid comprising at least one corrosion inhibitor into a casing, and displacing the anti-corrosion fluid into an annular space between the casing and a wellbore with a volume of cement. A displacement fluid may then be pumped into the casing to displace the cement into the annular space. Following hardening of the cement, a first section of the annular space outside the casing contains a volume of the anti-corrosion fluid and a second section of the annular space outside the casing contains the cement.

Other aspects and advantages of the disclosure will be apparent from the following description and the appended claims.

DETAILED DESCRIPTION

Embodiments herein are directed toward cementing without the need to have cement to the surface by utilizing an anti-corrosion fluid in place of cement to protect one or more sections of casing from corrosion.

Figure 1:
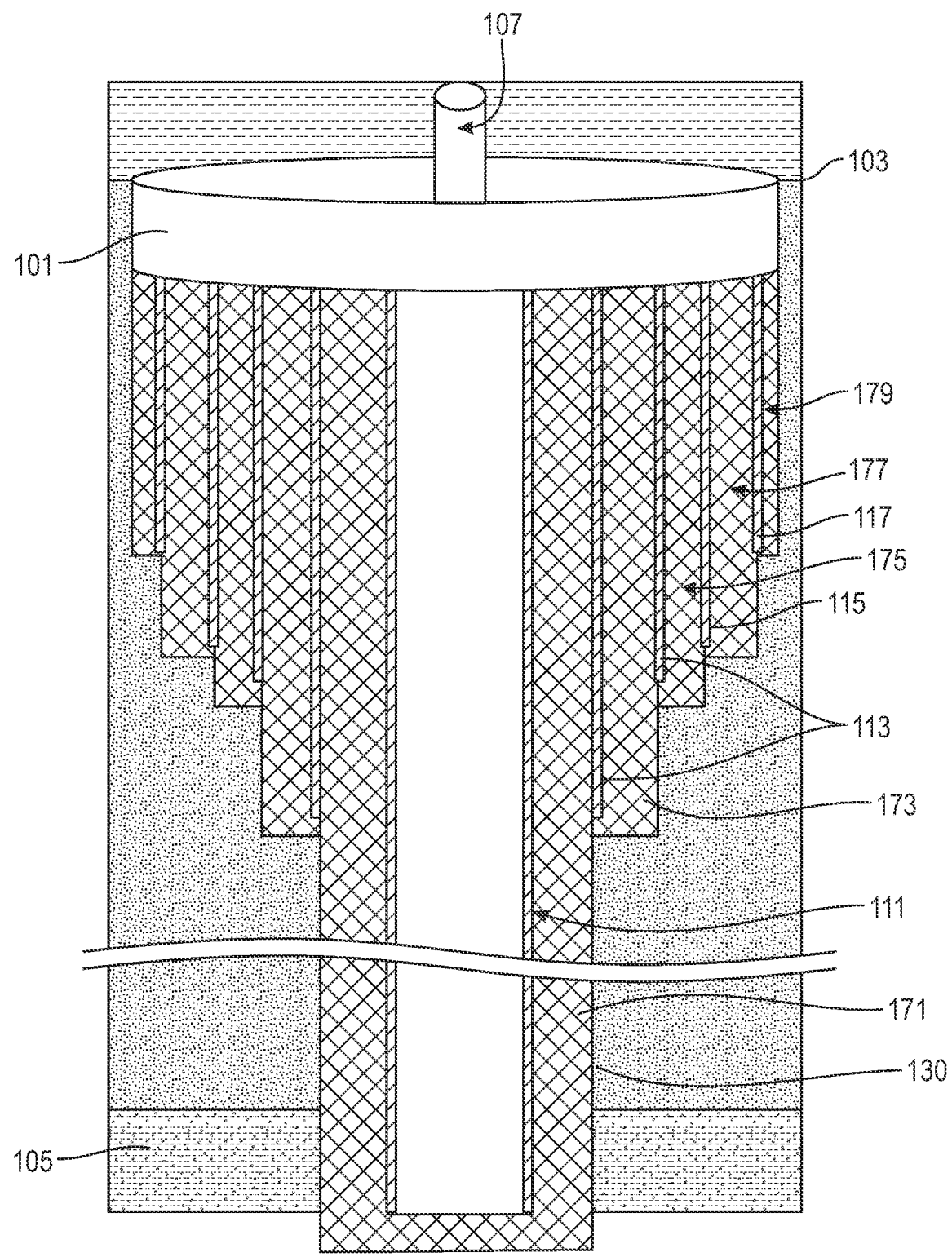
FIG. 1 depicts a cemented oil well as known in the art.

Compare FIG. 1 depicting a traditionally cemented casing as described above with FIG. 2 depicting two partially cemented casings.

Figure 2:
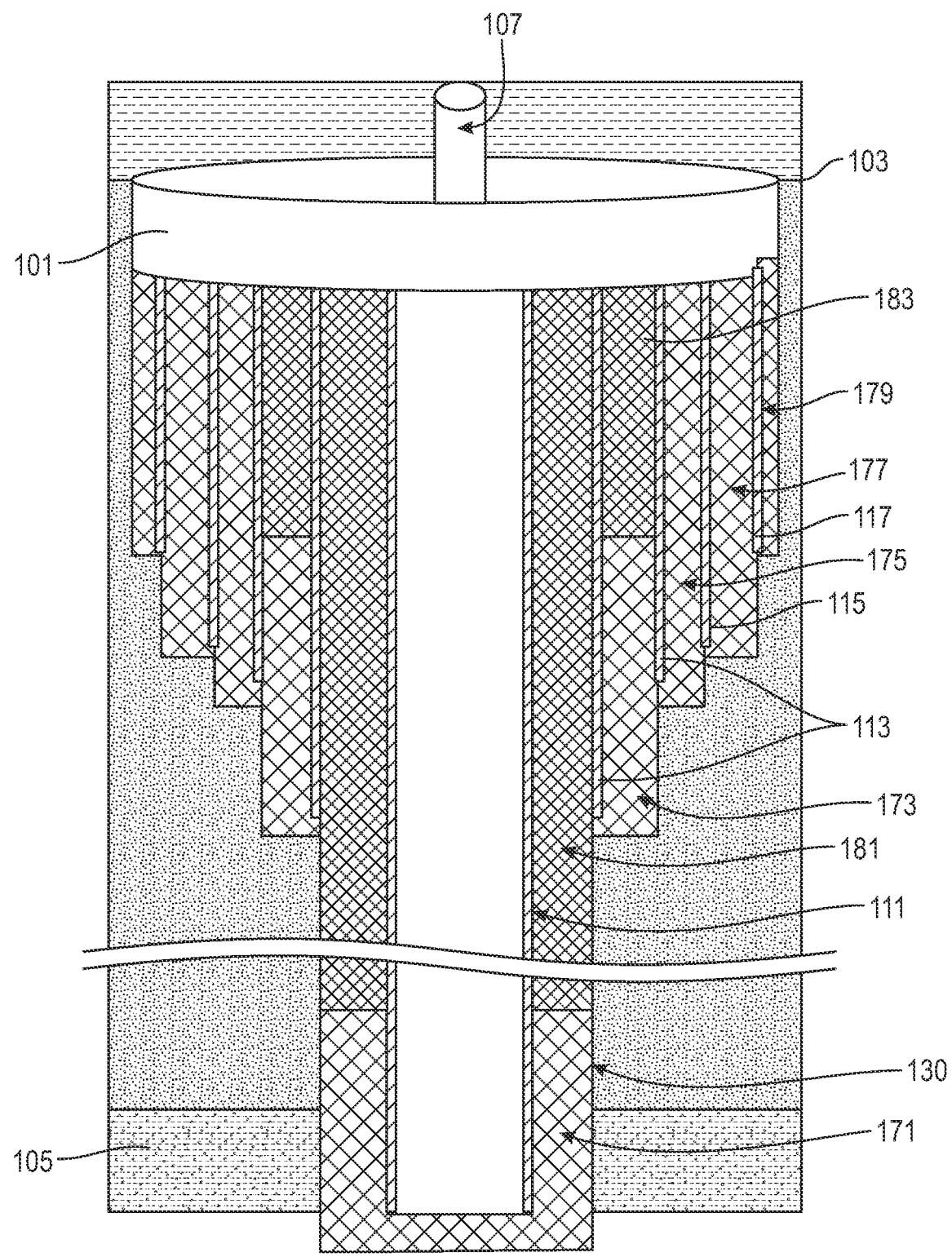
FIG. 2 depicts a partially cemented oil well, according to an embodiment of this disclosure.

As above, FIG. 2 depicts a wellhead 101 formed at the surface 103 end of the wellbore, includes a conductor casing 117, a surface casing 115, a number of production and/or drilling casings 113, 111, valving 107, and a Christmas tree (not depicted). The wellhead 101 may include a concentric arrangement of smaller casings which may include a production casing 111 and one or more intermediate casings 113. Listed from smallest to largest diameter, the concentric casings of an oil well may include the production casing 111, one or more intermediate casings 113 (FIG. 2 includes two intermediate casings), the surface casing 115, and the conductor casing 117. Production casing 111 and borehole 130 ends within or below formation 105 from which oil and/or gas is to be extracted.

FIG. 2 depicts the same arrangement of concentric casings as in FIG. 1. Similar annular spaces are disposed between the outer surface of a casing and the next larger diameter casing and/or the borehole wall. However, instead of being fully cemented as in FIG. 1, the annular space between the production casing and an inner intermediate casing as well as the annular space between the smaller intermediate casing and the larger intermediate casing in FIG. 2 are partially filled with anti-corrosion fluid.

FIG. 2 shows a partially cemented annular space between borehole 130 and production casing 111. Cemented annular space 171 disposed toward the bottom of borehole 130 with an anti-corrosive annular space 181 disposed above cemented annular space 171 toward the top of borehole 130. Anti-corrosive annular space 181, as depicted in FIG. 2 is disposed between production casing 111 and intermediate casing 113 toward wellhead 101, and between production casing 111 and borehole 130 toward the bottom of borehole 130. In some embodiments, the anti-corrosive annular space may be limited to between casings, with the cement filling the annular space between the inner casing and the wellbore.

A partially cemented annular space also exists between two intermediate casings 113. FIG. 2 shows cemented annular space 173 disposed toward the bottom of borehole 130 with an anti-corrosive annular space 183 disposed above cemented annular space 171 toward wellhead 101. Anti-corrosive annular space 183, as depicted in FIG. 2, is disposed between smaller intermediate casing 113 and larger intermediate casing 113 toward wellhead 101, and between smaller intermediate casing 113 and borehole 130 toward the bottom of borehole 130. In some embodiments, the anti-corrosive annular space may be limited to between casings, with the cement filling the annular space between the inner casing and the wellbore.

The two largest-diameter annular spaces are both fully cemented in FIG. 2. Specifically, cemented annular spaces 175, 177, and 179 are fully cemented along the entirety of the height of their respective casings 113, 115, and 117.

One or more embodiments may include any mixture of partially cemented annular spaces and fully cemented annular spaces.

Broadly, the method for protecting each casing with anti-corrosion fluid and cement requires at least three steps. A volume of anti-corrosion fluid is pumped into a casing. The anti-corrosion fluid is displaced into an annular space outside the casing with a volume of cement. Finally, a displacement fluid is inserted into the casing to displace the cement into the annular space. Central to both the method and system is the volume of anti-corrosion fluid and the volume of cement that are pumped into the casing and retained in the annular space. Furthermore, the total volume of anti-corrosion fluid and cement is approximately equivalent to the volume of the annular space. Consequently, the discussion of FIGS. 3A-3D below includes the specific geometry of each relevant space.

Figure 3A:
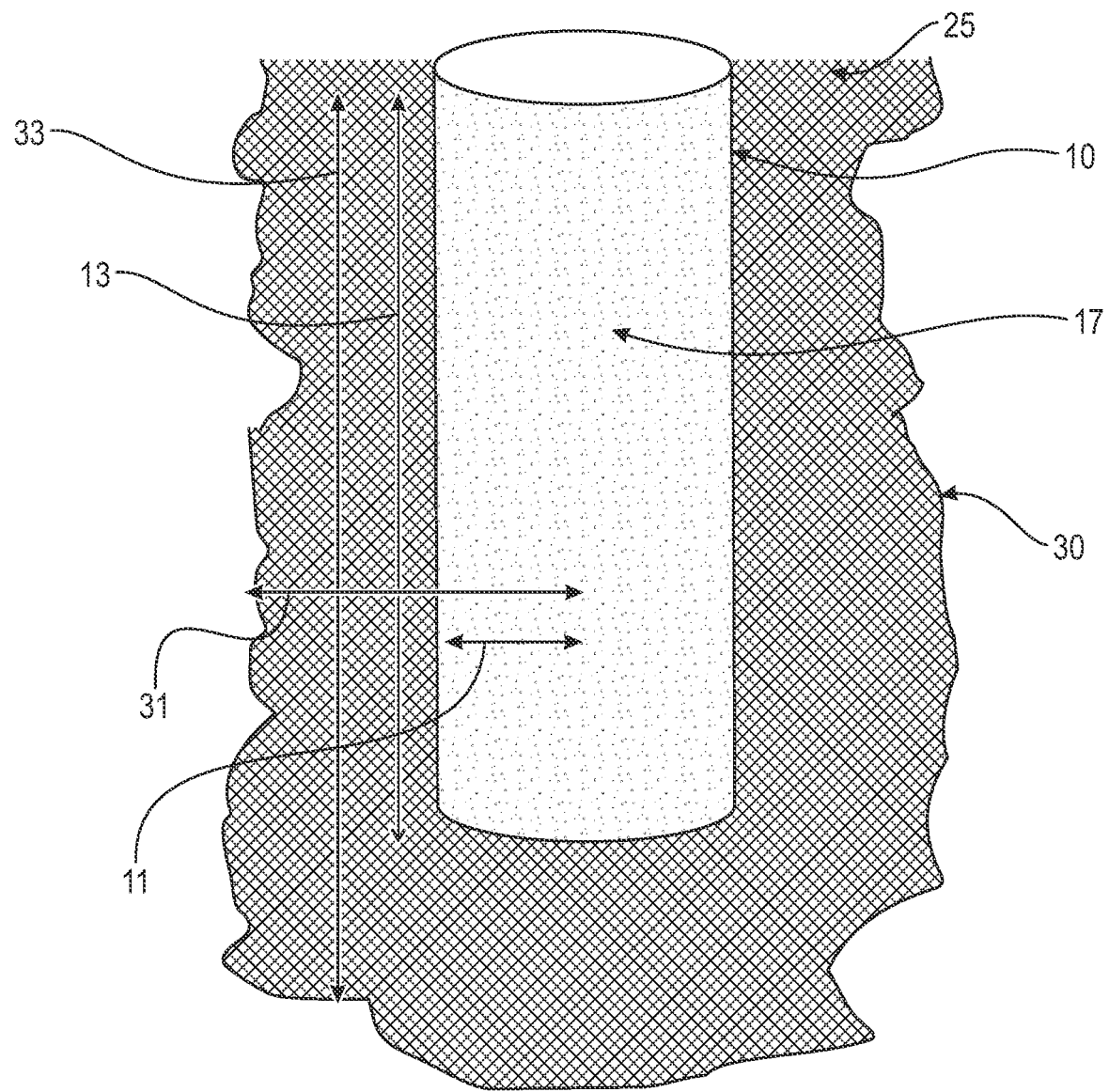
FIG. 3A-3D depict cross sections of the geometry of a partially cemented oil well, according to embodiments of this disclosure.
Figure 3B:
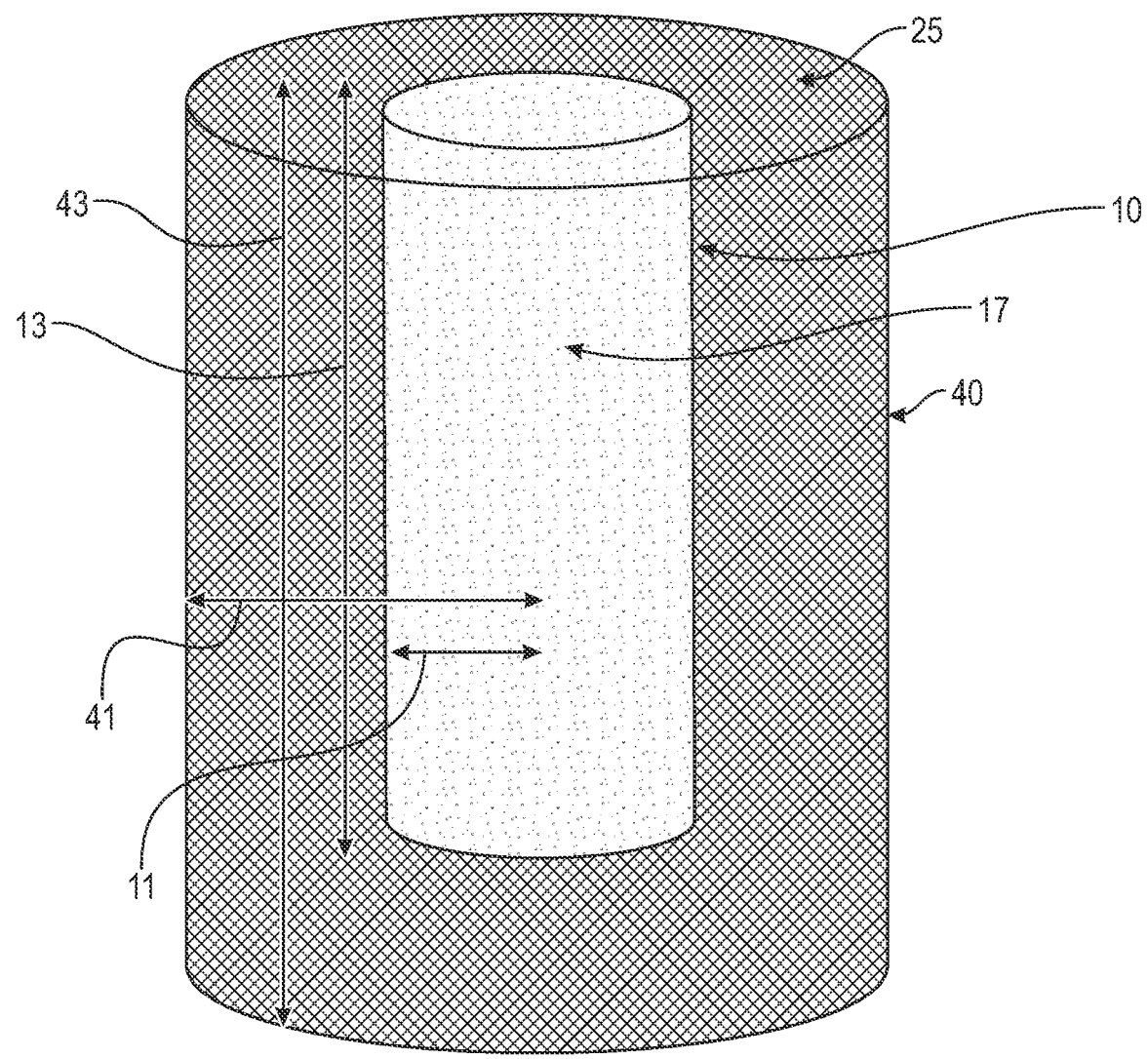

FIGS. 3A and 3B each depict a casing 10 within a borehole 30 or an outer casing 40, respectively, according to embodiments of this disclosure. Each casing 10 has a casing radius 11 and a casing height 13, which defines a casing volume 17. Casing height 13 is understood to mean an axial length measured along the wellbore, to include vertical, horizontal, and angled runs.

FIG. 3A depicts casing 10 within borehole 30. Borehole 30 also has a borehole height 33 and a borehole radius 31. Because borehole 30 may have slightly irregular walls, borehole radius 31 may be somewhat inconsistent. However, borehole radius 31 may be defined as the median radius of the borehole, or with other statistically calculated values such as an average, weighted average, etc. Between casing 10 and borehole 30 may be an annular space 25. Borehole height 33 is understood to mean an axial length measured along the wellbore, to include vertical, horizontal, and angled runs.

In a well having a concentric arrangement of multiple casings 10 as in FIGS. 1 and 2, one having ordinary skill with appreciate the annular space between casing 10 and borehole 30 may be outside of the casing 10 having the largest casing radius 11.

Casing 10 may be approximately concentrically arranged within borehole 30, or may be offset from the center.

The interior volume of borehole 30 may be approximated as a cylinder; thus the volume of borehole 30 may be calculated: $V_{BH}=\pi*r_{BH}{}^2*r_{BH}*$, where $V_{BH}$ is the borehole volume, $r_{BH}$ is borehole radius 31, and $h_{BH}$ is borehole height 33.

Similarly, casing volume 17 may be calculated with $V_C=\pi*r_C{}^2*h_C$, where $V_C$ is casing volume 17, $r_C$ is casing radius 11, and $h_C$ is casing height 13.

Between borehole 30 and casing 10 is an annular space 25. The volume of annular space 25 may be equal to the borehole volume minus casing volume 17. Thus, the volume of annular space 25 may be calculated as $V_{AS}=\pi*(R_{BH}{}^2*h_{BH}-r_C{}^2*h_C)$, where $V_{AS}$ is annular space 25 volume.

The annular space 25 may not be perfectly annular in shape, because the casing height 13 may be slightly less than the borehole height 33 to allow room for fluids to flow out of the casing 10 into the borehole 30. However, the difference between the borehole height 33 and casing height 13 may be negligible when the borehole 30 is deep and, thus, there is a small percentage difference between the heights of the borehole 30 and the casing 10. Thus, if one assumes the borehole height 33 and casing height 13 are approximately the same (and equal to h), the volume of the annular space 25 may be calculated as $V_{AS}=\pi*(r_{BH}-r_C)^2*h$. Note, this approximation may be unreasonable for shorter casings/boreholes.

One of ordinary skill will appreciate how a concentric arrangement of multiple casings will result in multiple annular spaces between the multiple casings 10 as in FIGS. 1 and 2. One or more of these annular spaces 25 may be fully cemented as in FIG. 1 or may be partially cemented. In some embodiments, the remaining annular spaces may be taken by empty space or by anti-corrosion fluid as in FIG. 2.

FIGS. 1 and 2 show multiple annular spaces disposed between a casing of interest and a next larger casing that may serve as "an outer casing." To that end, outer casing 40 may be the casing with a next largest diameter than casing 10 when more than two casings are arranged roughly concentrically. Referring to FIG. 2 according to one or more embodiments of this disclosure, one example of outer casing 40 may be intermediate casing 113 with production casing 111 serving as casing 10.

FIG. 3B depicts casing 10 within outer casing 40. Casing 10 has a casing height 13 and a casing radius 11. Additionally, outer casing 40 has an outer casing height 43 and an outer casing radius 41. Casing 10 may be approximately concentrically arranged within outer casing 40, or may be offset from the center. Outer casing height 43 is understood to mean an axial length measured along the wellbore, to include vertical, horizontal, and angled runs.

The interior volume of outer casing 40 may be approximated as a cylinder; thus a volume of outer casing 40 may be calculated: $V_{BH}=\pi*r_{BH}{}^2 h_{BH}$, where $V_{BH}$ is the outer casing volume, $r_{BH}$ is outer casing radius 41, and $h_{BH}$ is outer casing height 43.

Similarly, a casing volume 17 may be calculated with $V_C=\pi*r_C{}^2*h_C$, where $V_C$ is casing volume 17, $r_C$ is casing radius 11, and $h_C$ is casing height 13.

Between outer casing 40 and casing 10 is an annular space 25. The volume of annular space 25 may be equal to the outer casing volume minus casing volume 17. Thus, the volume of annular space 25 may be calculated as $V_{AS}=\pi*(r_{BH}{}^2*h_{BH}-r_C{}^2*h_C)$, where $V_{AS}$ is annular space 25 volume.

Annular space 25 may not be perfectly annular in shape, because the casing height 13 may be slightly less than the outer casing height 43 to allow room for fluids to flow out of the casing 10 into the outer casing 40. However, the difference between the outer casing height 43 and casing height 13 may be negligible when the height of the outer casing 40 is large and, thus, there is a small percentage difference between the heights of the outer casing 40 and the casing 10. Thus, if one assumes the outer casing height 43 and casing height 13 are approximately the same (and equal to h), the volume of the annular space 25 may be calculated as $V_{AS}=\pi*(r_{BH}-r_C)^2*h$. Note, this approximation may be unreasonable for shorter casings/outer casings.

Figure 3C:
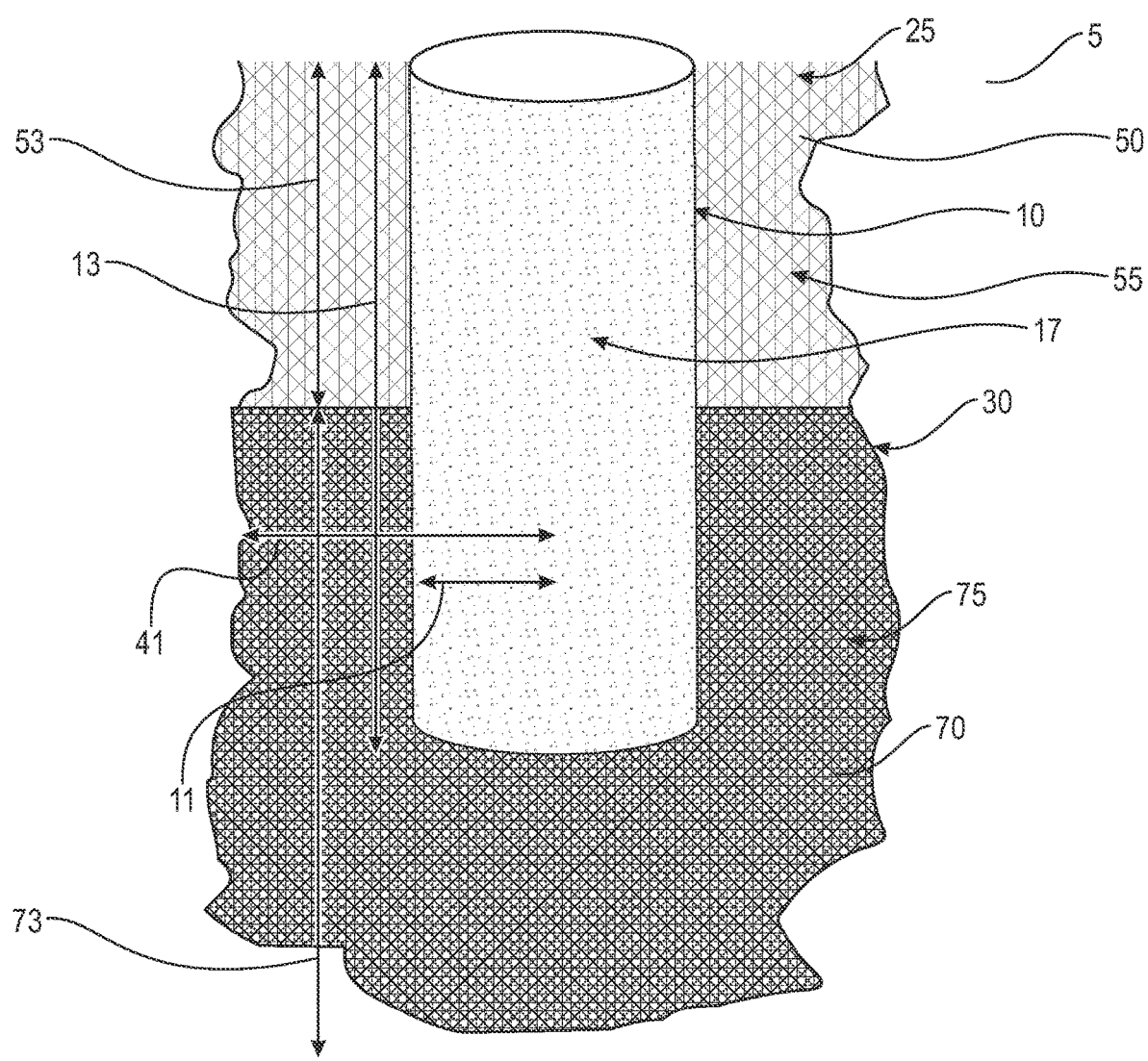
Figure 3D:
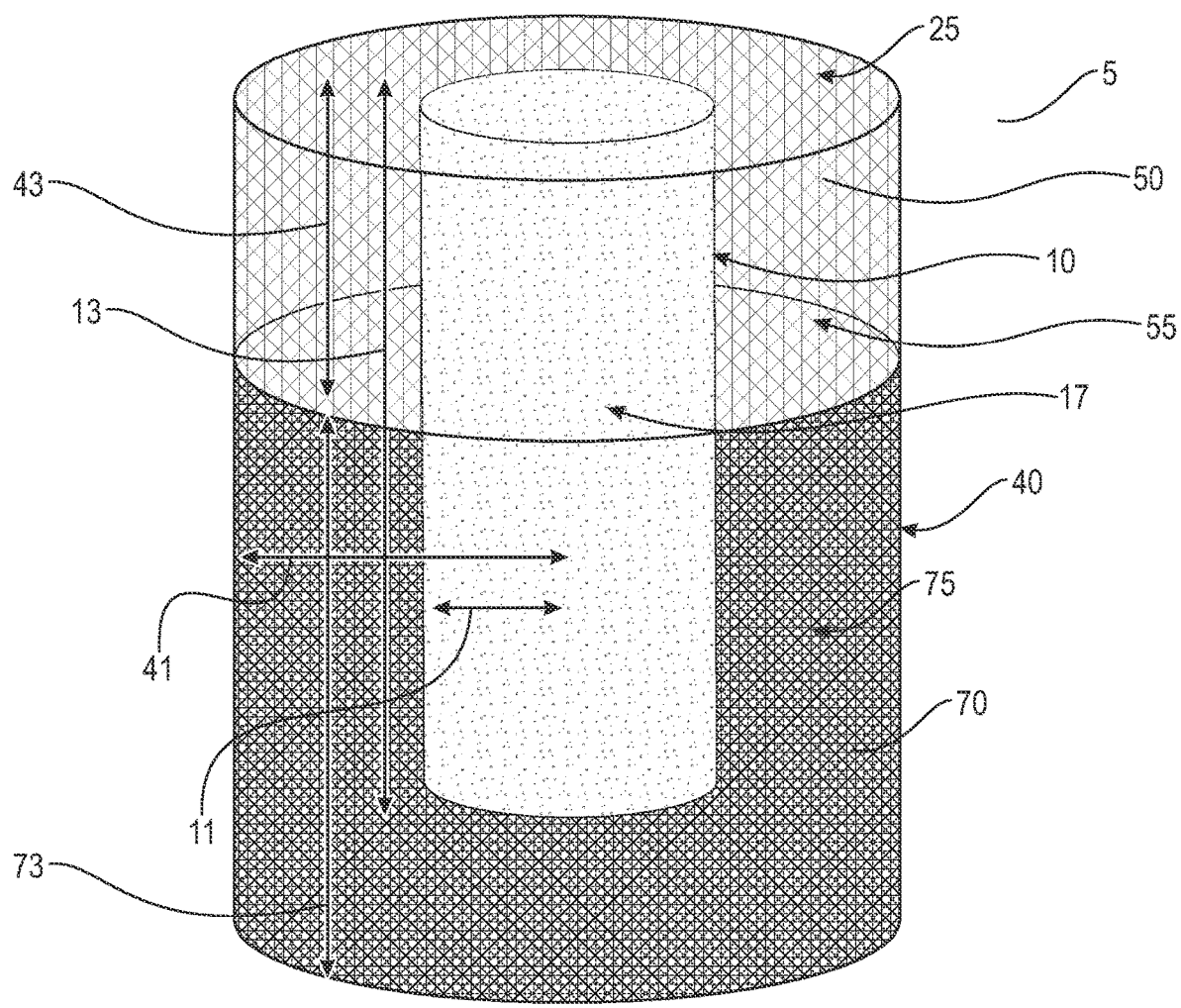

FIGS. 3C and 3D depict embodiments of this disclosure with casing 10 within borehole 30 and outer casing 40, respectively, as depicted above. Additionally, FIGS. 3C and 3D depict a partially cemented casing 5 where the uncemented regions may be filled with an anti-corrosion fluid 50. Additionally, annular space 25 may be within outer casing 40 at some heights and within borehole 40 at other heights along casing 10.

Casing 10 may be partially cemented with any type of cement 70, while the remainder of the casing 10 may be covered by anti-corrosion fluid 50 utilizing any corrosion inhibitor. Anti-corrosion fluid 50 may float atop cement 70 in annular space 25 surrounding casing 10. This anti-corrosion fluid 50 may prevent or minimize the corrosion of casing 10 without the permanence of cementing the entire casing with cement 70 along the entire height of casing 10.

Consider FIG. 3C, depicting a partially cemented annular space 5 with annular space 25 disposed between casing 10 and borehole 30 arranged as in FIG. 3A. In FIG. 3C, annular space 25 is partially cemented 5. Thus, annular space 25 between casing 10 and borehole 30 may have two sections: an anti-corrosion fluid annular space 55 filled with an anti-corrosion fluid 50 (a first section) disposed above a cemented annular space 75 filled with a cement 70 (a second section).

As before, casing height ($h_c$), casing radius 11 ($r_C$), and borehole radius 31 ($r_{BH}$) may be measured. However, borehole height 33 ($h_{BH}$) may be broken into two components: an anti-corrosion fluid annular space height 53 ($h_{AFAS}$) and a cemented annular space height 73 ($h_{CAS}$). As above, the annular space height 53 and cemented annular space height 73 are understood to mean an axial length measured along the wellbore, to include vertical, horizontal, and angled runs. Similarly to above, one may calculate a casing volume 17 ($V_C$), a volume of anti-corrosion fluid annular space 55 ($V_{AFAS}$, roughly equal to a volume of anti-corrosion fluid used), and a volume of cemented annular space 75 ($V_{CAS}$, roughly equal to a volume of cement used, but may be adjusted accordingly based on any expansion or contraction in the volume that may occur during curing of the cement for cements that do change volume during cure).

Assuming $h_C \approx h_{BH}$ (because $h_C$ and $h_{BH}$ are large, for example), $V_{AFAS}=\pi*(r_{BH}-r_C)^2*h_{AFAS}$, where $V_{AFAS}$ is the volume and $h_{AFAS}$ is the height 53 of the anti-corrosion fluid annular space 55. Similarly, $V_{CAS}=\pi*(r_{BH}-r_C)^2*h_{CAS}$, where $V_{CAS}$ is the volume and $h_{CAS}$ is the height 73 of the cemented annular space 75. Furthermore, because $h_{AFAS}+h_{CAS} \approx h_{BH}$, $V_{AFAS}+V_{CAS} \approx V_{AS}$. (If it is not reasonable to assume $h_C \approx h_{BH}$, one of skill in the art will appreciate how to correct the volume calculations for $V_{AFAS}$, $V_{CAS}$, and $V_{BH}$.)

Similarly, consider FIG. 3D, depicting a partially cemented annular space 5 with annular space 25 disposed between casing 10 and outer casing 40 arranged as in FIG. 3B. In FIG. 3D, annular space 25 is partially cemented 5. Thus, annular space 25 between casing 10 and outer casing 40 may have two sections: an anti-corrosion fluid annular space 55 filled with an anti-corrosion fluid 50 (a first section) disposed above a cemented annular space 75 filled with a cement 70 (a second section).

As before, casing height ($h_c$), casing radius 11 ($r_C$), and outer casing radius 41 ($r_{OC}$) may be measured. However, outer casing height 43 ($h_{BH}$) may be broken into two components: an anti-corrosion fluid annular space height 53 ($h_{AFAS}$) and a cemented annular space height 73 ($h_{CAS}$). As above, the annular space height 53 and cemented annular space height 73 are understood to mean an axial length measured along the wellbore, to include vertical, horizontal, and angled runs. Similarly to above, one may calculate a casing volume 17 ($V_C$), a volume of anti-corrosion fluid annular space 55 ($V_{AFAS}$, roughly equal to a volume of anti-corrosion fluid used), and a volume of cemented annular space 75 ($V_{CAS}$, roughly equal to a volume of cement used).

Assuming $h_C \approx h_{OC}$ (because $h_C$ and $h_{OC}$ are large, for example), $V_{AFAS} = \pi*(r_{OC}-r_C)^2*h_{AFAS}$, where $V_{AFAS}$ is the volume and $h_{AFAS}$ is the height 53 of the anti-corrosion fluid annular space 55. Similarly, $V_{CAS} = \pi*(r_{OC}-r_C)^2*h_{CAS}$, where $V_{CAS}$ is the volume and $h_{CAS}$ is the height 73 of the cemented annular space 75. Furthermore, because $h_{AFAS} + h_{CAS} \approx h_{OC}$, $V_{AFAS} + V_{CAS} \approx V_{AS}$. (If it is not reasonable to assume $h_C \approx h_{OC}$, one of skill in the art will appreciate how to correct the volume calculations for $V_{AFAS}$, $V_{CAS}$, and $V_{OC}$.)

In a partially cemented annular space 5 within either a borehole 30 or an outer casing 40 as depicted in FIGS. 3C and 3D, the height of the cemented annular space 73 ($h_{CAS}$) may be less than the height of the casing 13 ($h_C$). In one or more embodiments, the height of the cemented annular space may be less than about 90% of the height of the casing 13. Accordingly, the height of the anti-corrosion fluid annular space 53 ($h_{ACAS}$) may be greater than about 10% of the height of the casing 13. In one or more embodiments, the height of the cemented annular space 73 may be greater than about 60% of the height of the casing 13. Accordingly, the height of the anti-corrosion fluid annular space 53 may be less than about 40% of the height of the casing 13. In one or more embodiments, the height of the cemented annular space 73 may be between about 60% and about 90% of the height of the casing 13. Mathematically, these relationships may be written: $0.6*h_C \leq h_{CAS} \leq 0.9*h_C$ and $0.1*h_C \leq h_{AFAS} \leq 0.4*h_C$.

Similarly, in a partially cemented annular space 5 surrounded by either a borehole 30 or an outer casing 40 (as depicted in FIGS. 3C and 3D, respectively), the volume of the cemented annular space 75 ($V_{CAS}$) may be less than the volume of the annular space 25 ($V_{AS}$). In one or more embodiments, the volume of the cemented annular space may be less than about 90% of the volume of the annular space. Accordingly, the volume of the anti-corrosion fluid annular space 55 ($V_{ACAS}$) may be greater than about 10% of the volume of the annular space. In one or more embodiments, the volume of the cemented annular space may be greater than about 60% of the volume of the annular space. Accordingly, the volume of the anti-corrosion fluid annular space may be less than about 40% of the volume of the annular space. In one or more embodiments, the volume of the cemented annular space may be between about 60% and about 90% of the volume of the annular space. Mathematically, these relationships may be written: $0.6*V_{AS} \leq V_{CAS} \leq 0.9*V_{AS}$ and $0.1*V_{AS} \leq V_{AFAS} \leq 0.4*V_{AS}$.

FIGS. 4A-4D depict, stepwise, a method for forming a partially cemented annular space, according to one embodiment. Depicted within each of these figures is a casing 10, an outer casing 40, and an annular space 25 disposed between casing 10 and outer casing 40. While the figures here depict outer casing 40, a partially cemented annular space between a casing and a borehole (as in FIG. 3C) could also be formed with a similar method.

Figure 4A:
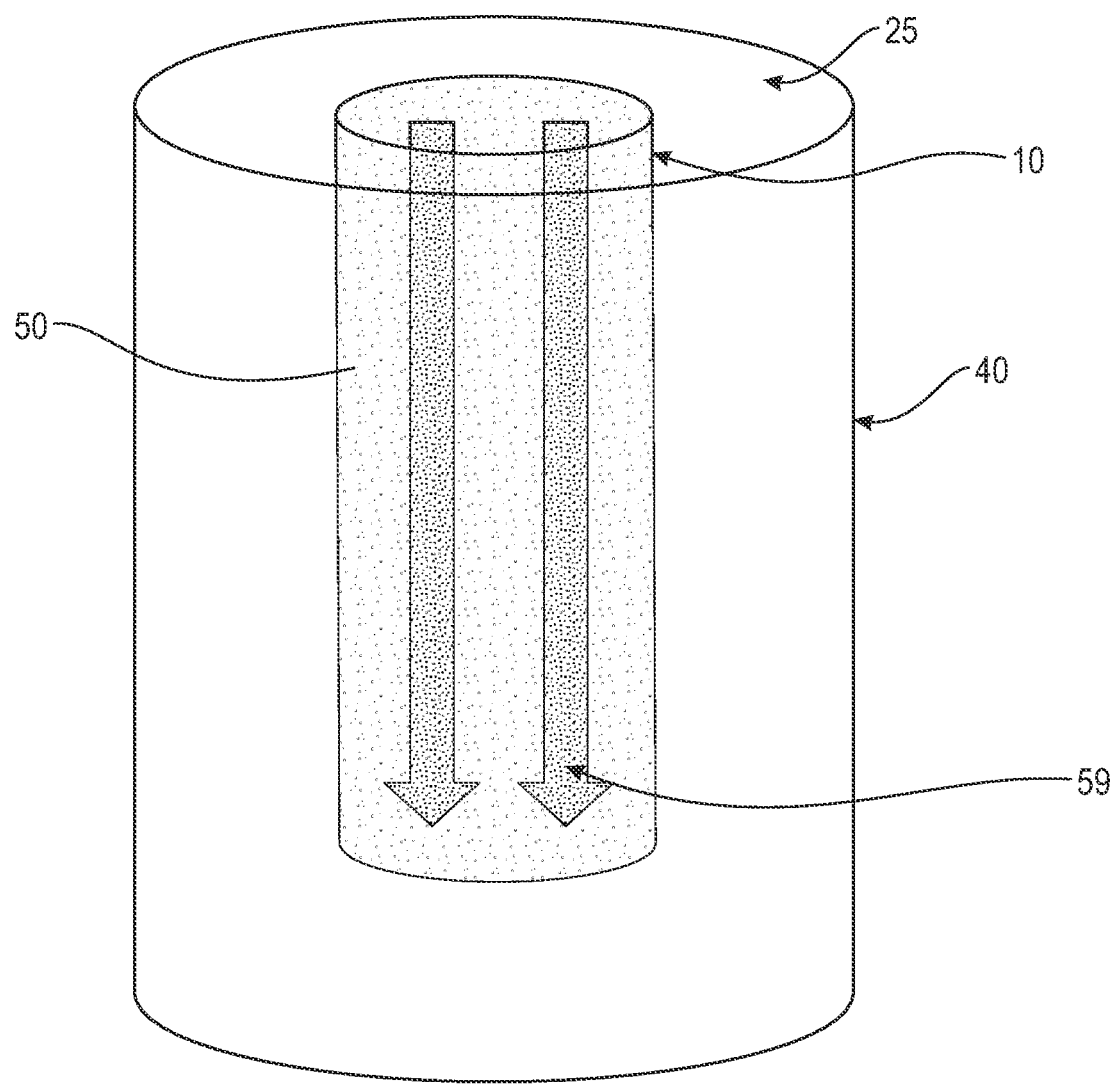
FIGS. 4A-4D schematically depict an embodiment of the method for forming one or more embodiments of this disclosure.

Consider FIG. 4A, which depicts a first step according to embodiments of this disclosure. An anti-corrosion fluid flow 59 is pumped into casing 10. Thus, casing 10 is filled with an anti-corrosion fluid 50. FIG. 4A depicts annular space 25 as being empty, however, annular space 25 may be filled with any sort of drilling mud or other temporary liquid. To that end, anti-corrosion fluid flow 59 may displace any residual drilling mud within casing 10 into annular space 25.

Figure 4B:
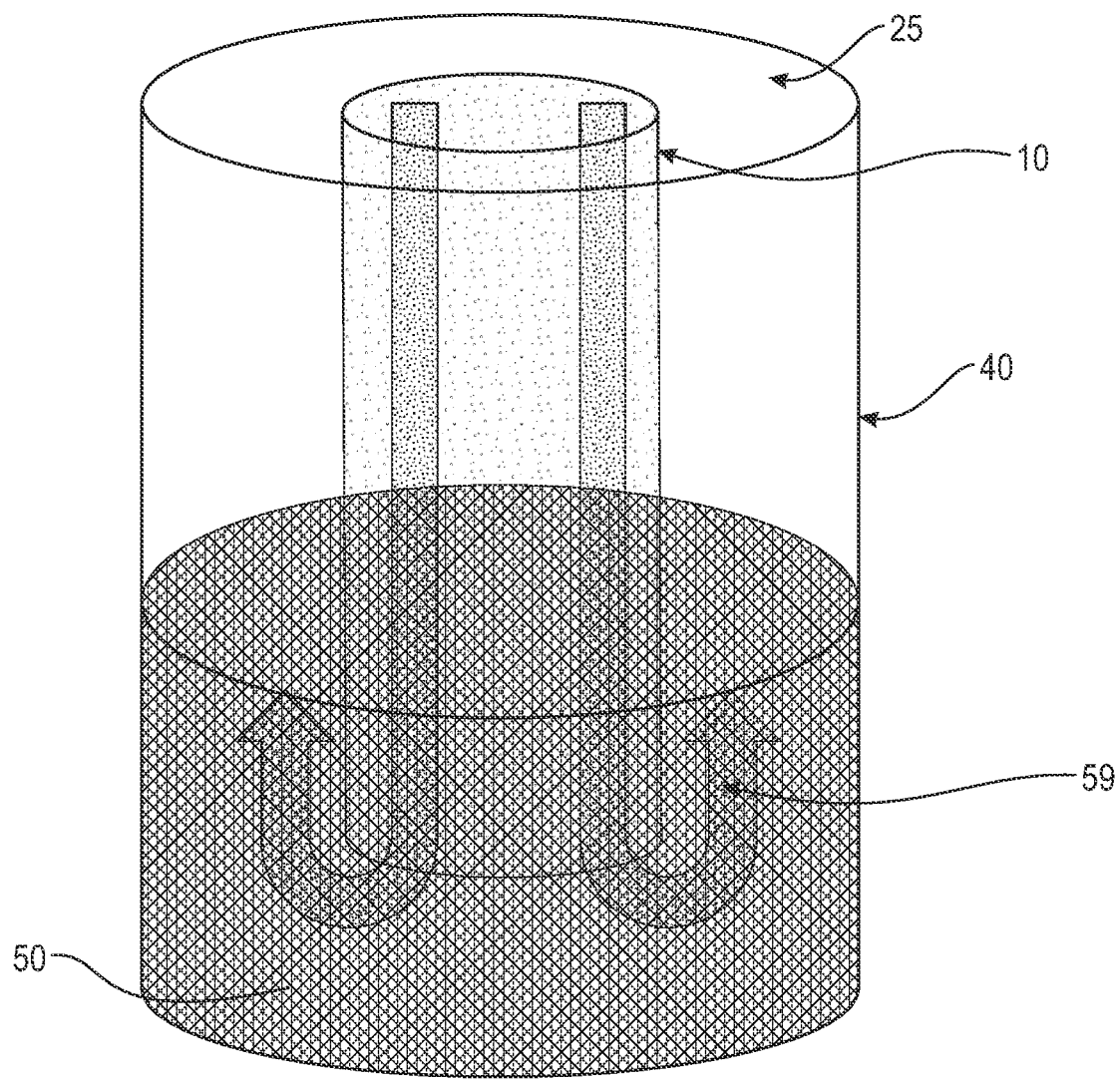

FIG. 4B depicts anti-corrosion fluid 50 as it begins to fill annular space 25 according to an embodiment. Anti-corrosion fluid flow 59 continues until a desired volume of anti-corrosion fluid 50 is present in the system. The volume of anti-corrosion fluid 50 utilized in the final, partially cemented casing may depend on a number of factors, as discussed above.

In one or more embodiments, cement 70 may be introduced to casing 10 directly after anti-corrosion fluid 50. Thus, in some embodiments, no spacer fluids may be pumped into the wellbore intermediate the anti-corrosion fluid and the cement.

Figure 4C:
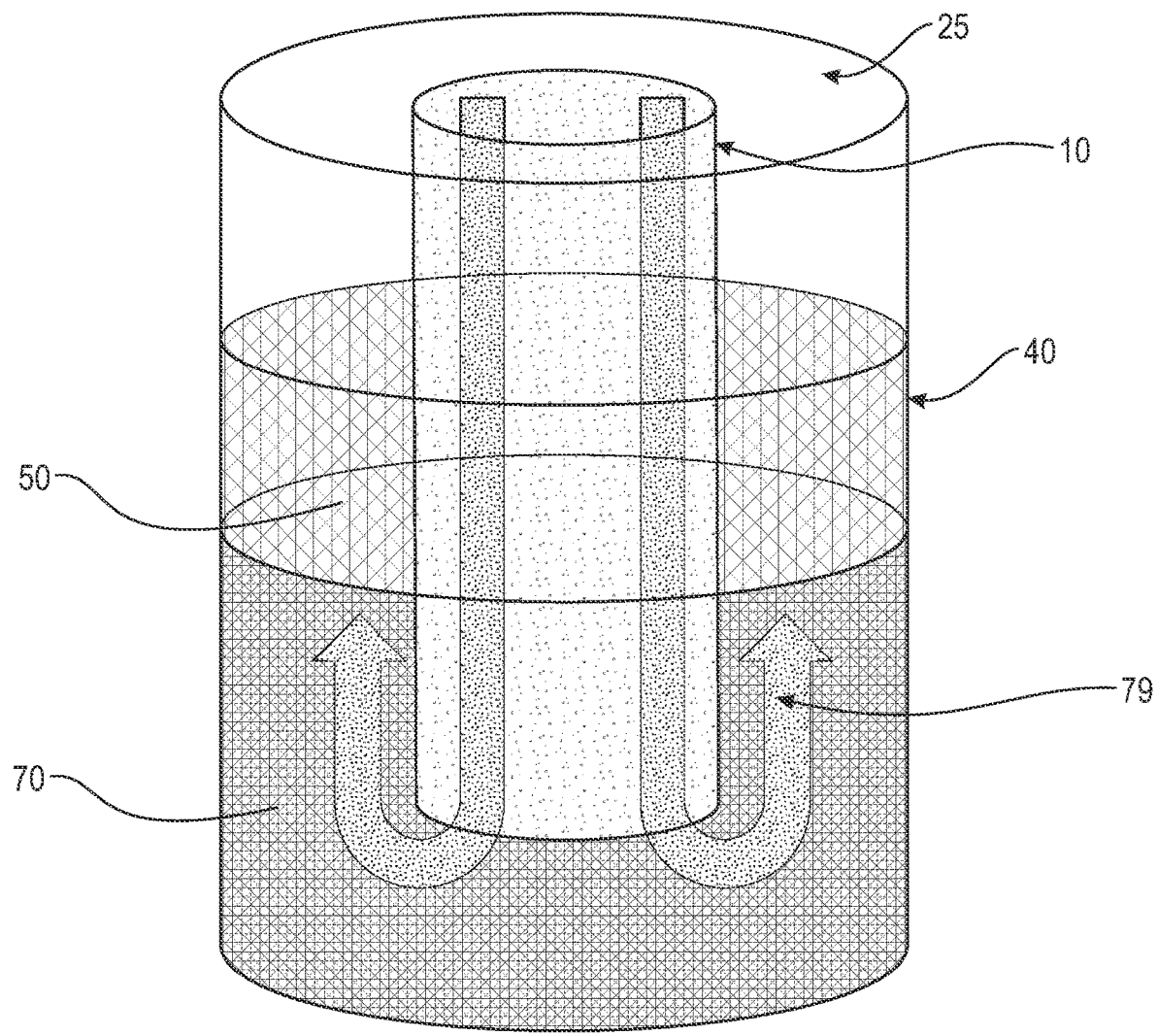

FIG. 4C depicts a cement flow 79 being pumped into casing 10 and filling part of annular space 25, according to an embodiment of the method. Due to the properties of anti-corrosion fluid 50 and cement 70, anti-corrosion fluid 50 may separate from and sits atop cement 70. Thus, cement 70 entering annular space 25 causes the displacement of anti-corrosion fluid 50 upward into annular space 25. The relevant chemical properties of the two liquids (such as polarity, density, viscosity, etc.) are discussed in detail below. Again, the volume of cement 70 and anti-corrosion fluid 50 used within the final, partially cemented casing is discussed above.

Figure 4D:
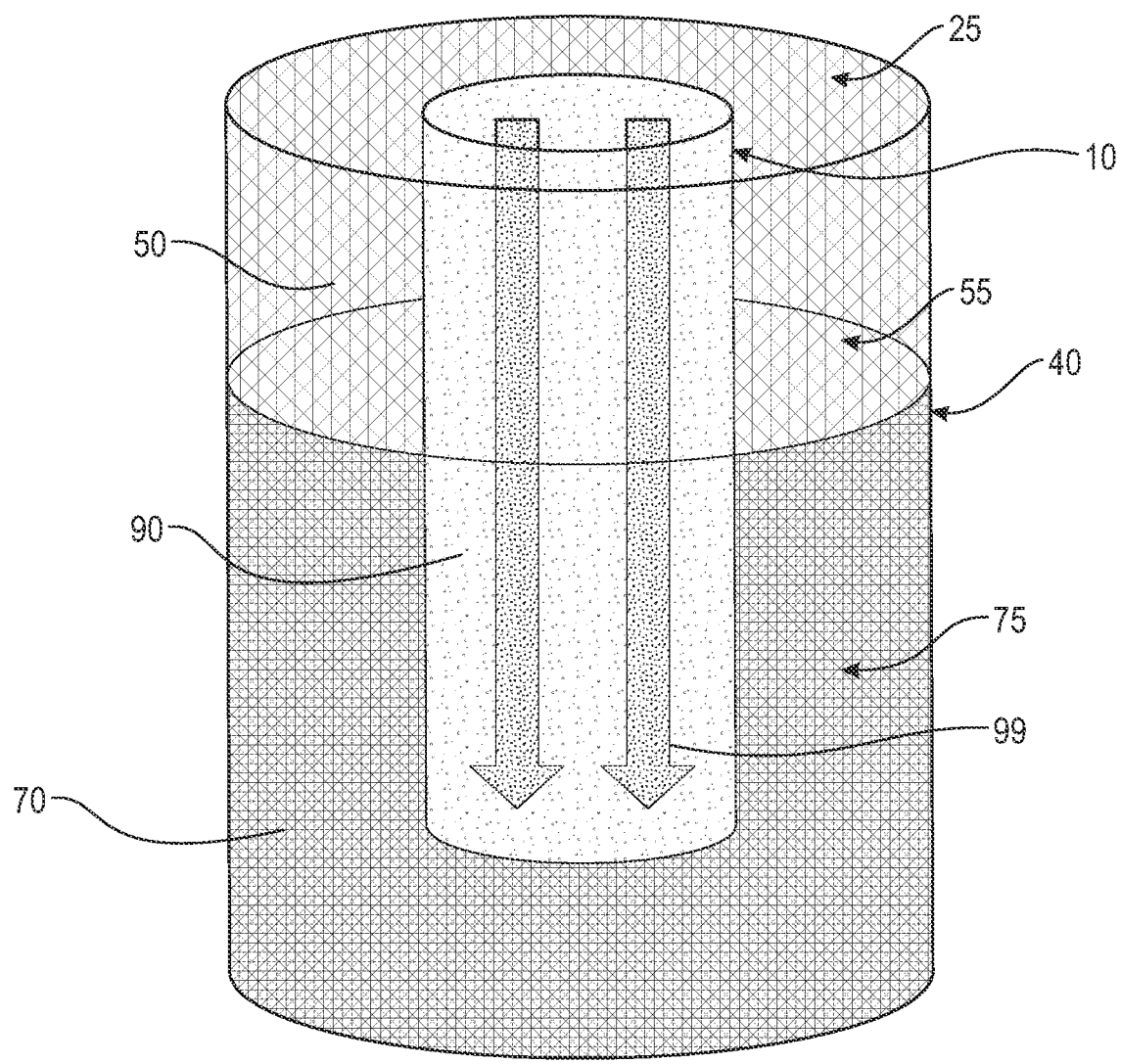

Finally, FIG. 4D depicts a displacement fluid flow 99 within casing 10, according to embodiments. This displacement fluid 90 may be used to displace cement 70 and anti-corrosion fluid 50 into their final locations within annular space 25.

In one or more embodiments, as discussed above, annular space 25 may be filled with anti-corrosion fluid 50 and cement 70. Thus, any drilling fluid or other temporary liquid present in casing 10 and/or annular space 25 before the beginning of this method may be entirely displaced out of the annular space 25 by the anti-corrosion fluid 50 and cement 70.

In some embodiments, displacement fluid 90 may be retained within casing 10 for sufficient time to allow the cement 70 to fully harden. The hardening of cement 70 forms a cemented annular space 75, above which is an anti-corrosion fluid annular space 55. In some embodiments, the hardening of cement 70 may be an additional step required to form the partially cemented annular space of this disclosure.

Anti-corrosion fluid 50 is much easier to deform than hardened cement 70. Consequently, a region of casing 10 surrounded by anti-corrosion fluid annular space 55 may be easier to deform and/or perforate than a region of casing 10 surrounded by cemented annular space 75. Therefore, one or more embodiments of this disclosure may further entail casing punching of casing 10 at an axial height within anti-corrosion fluid annular space 55 where anti-corrosion fluid 50 is retained in the annular space 25. As above, this axial height is understood to mean an axial length measured along the wellbore, to include vertical, horizontal, and angled runs. Furthermore, one or more embodiments of this disclosure may include injecting remedial fluids into the annular space 25 via the punched casing within anti-corrosion fluid annular space 55.

One having skill in the art will appreciate that FIGS. 4A-4D may be simplified depiction of the method steps and/or may be focused on the bottom of casing 10 and outer casing 40. Specifically, more than one fluid (for example drilling mud, anti-corrosion fluid 50, cement 70, displacement fluid 90, etc.) may be simultaneously present within casing 10 given the long height of some casings employed in oil drilling.

Turning to an anti-corrosion fluid of the above described method and device, according to one or more embodiments of this disclosure. The device and method of this disclosure may utilize an anti-corrosion fluid that includes one or more corrosion inhibiter(s). These corrosion inhibitors, and thus the anti-corrosion fluid overall, may inhibit corrosion of the casing 10, which may be made of carbon steel.

In one or more embodiments, the anti-corrosion fluid may be a solution containing one or more organic corrosion inhibitor(s). Some examples of organic corrosion inhibitors that may be employed may be divided into groups reflecting the specific elements present: compounds containing nitrogen; compounds containing nitrogen and sulfur; compounds containing sulfur; and compounds containing nitrogen and oxygen.

According to one or more embodiments, the corrosion inhibitor(s) employed in this disclosure may contain nitrogen. Specifically, these nitrogen-containing corrosion inhibitors may include amines, pyridine derivatives, quaternary ammonium salts, triazole derivatives, Schiff base, amino acids, and indazole, or the like, or mixtures or combinations thereof.

According to one or more embodiments, the corrosion inhibitor(s) employed in this disclosure may contain nitrogen and sulfur. Specifically, these nitrogen and sulfur containing corrosion inhibitors may include imidazole derivatives, thiadiazole derivatives, and thiazole derivatives, or the like, or mixtures or combinations thereof.

According to one or more embodiments, the corrosion inhibitor(s) employed in this disclosure may contain sulfur. Specifically, these sulfur-containing corrosion inhibitors may include thiourea derivatives and sulfonates, or the like, or mixtures or combinations thereof.

According to one or more embodiments, the corrosion inhibitor(s) employed in this disclosure may contain nitrogen and oxygen. Specifically, these nitrogen and oxygen containing corrosion inhibitors may include oxazol derivatives, phthalimides, plant extracts, and natural anti-corrosion chemicals, or the like, or mixtures or combinations thereof.

Some embodiments may employ a triethanoleamine-based (TEA) and/or polyethylene polyamine-based fluid as the corrosion inhibitor.

Some embodiments may employ one or more amines as the corrosion inhibitor within the anti-corrosion fluid. Amines are one of the groups of compounds that have improved inhibition efficiency (IE) against corrosion in carbon steel. These compounds inhibit corrosion by adsorption of the amine group to the metal surface, retarding the anodic dissolution of iron by the protective aggregate layer bonding on this surface. Specifically, amines have a free pair of electrons which develop a hydrophobic film on the surface. This hydrophobic film reduces the adhesion strength at the surface thereby reducing the attachment of particles to the surface. In other words, the amines form a protective film on the metal surface helping to prevent corrosion attack from the oxidation reaction of corrosion. Additionally, because of the larger number of nitrogen atoms, each having a free pair of electrons, triamines may have a higher IE than diamines or monoamines.

Furthermore, one having skill in the art will readily appreciate the variety of corrosion inhibitors that may be employed this disclosure.

The anti-corrosion fluid may further be classified as drilling fluid and/or completion fluid. Thus, the anti-corrosion fluid may further include weighting agent(s) and/or other additives in addition to the corrosion inhibitor(s). These additives may alter the anti-corrosion fluid so it achieves the desired properties (density, viscosity, polarity, etc.). These properties may be tuned, in one or more embodiments, so the anti-corrosion fluid properly displaces the drilling fluid, while remaining above the cement and/or within the wellbore following completion of the cementing operation.

In one or more embodiments, the anti-corrosion fluid may a non-polar liquid.

In one or more embodiments, the anti-corrosion fluids may have a density of between about 62.4 lb/ft$^3$ (999.5 kg/m$^3$) and about 170 lb/ft$^3$ (2725 Kg/m$^3$). In some embodiments, the anti-corrosion fluid may be less dense than the cement.

The method and device further utilizes cement. This cement is used to partially surround one or more casings, in a process called "cementing." This cement may be a mixture of cement and water. The cement component may be any acceptable cement component for use in the embodiments described herein. In some embodiments, the cement component may be a Portland cement, such as cement from class A, B, C, D, E, F, G, or H. The cement may also include one or more aggregate(s), such as silica sand and/or silica flour. In liquid form, prior to setting, the cement is sometimes termed a cement slurry in the art.

The cement employed in this disclosure may further include one or more additives. These additives may be used to change various factors of the cement to better optimize it for this particular method and system. In some embodiments, the additives may include one or more defoamer, dispersant, retarder, weighting agent, and/or viscosifier.

Broadly, the density of the cement used is important for cementing processes. For oil wells drilled through high pressure formations, cement slurries having a high density may be used to avoid uncontrolled blow-outs. For oil wells which are drilled through low pressure formations where it is not advisable to expose the formations to high hydrostatic pressure, cement slurries having a low density may be used. A cement slurry having a too high density, and thereby a high hydrostatic pressure, may result in breakdown of the formation and loss of the cement slurry into the formation resulting in lost circulation.

In one or more embodiments, the cement may have a density of between about 65 lb/ft$^3$ (1041 kg/m$^3$) and about 170 lb/ft$^3$ (2723 kg/m$^3$). In some embodiments, the cement may be more dense than the anti-corrosion fluid.

Finally, in one or more embodiments, the cement may include water and thus may be a polar solution.

While the individual properties of the anti-corrosive fluid and of the cement are important, their relative properties may also impact the method and system of this disclosure. In particular, their miscibility as well as their relative polarity, density and/or viscosity may be important to one or more embodiments of this disclosure.

In some embodiments, the anti-corrosion fluid may have a low miscibility in the cement or may be essentially immiscible in the cement. In some embodiments, the cement may be an essentially polar solution and the anti-corrosion fluid may be an essentially non-polar solution. The polarity difference between the anti-corrosion fluid and the cement may cause those two liquids to remain separate.

In some embodiments, the cement may have a higher density than the anti-corrosion fluid. A larger cement density may help push the anti-corrosion fluid above the cement. In some embodiments, if the density difference is large enough, the anti-corrosion fluid and the cement will have sufficient separation and the cement will be able to properly displace the anti-corrosion fluid in the annular space. In some embodiments, that density difference between the anti-corrosion fluid and the cement may be greater than or equal to 2 lb/ft$^3$ (32.0 kg/m$^3$). In some embodiments, the cement may have a density that is at least 10 lb/ft$^3$ (160 kg/m$^3$) greater than the density of the anticorrosion fluid (i.e., 25 lb/ft$^3$ (400 kg/m$^3$) greater, 50 lb/ft$^3$ (800 kg/m$^3$) greater, 75 lb/ft$^3$ (1201 kg/m$^3$) greater, etc.). In some embodiments, the density difference between the cement and the anti-corrosion fluid may be less than about 100 lb/ft$^3$ (1601 kg/m3).

In some embodiments, the cement may have a higher viscosity than the anti-corrosion fluid. A larger cement viscosity may help push the anti-corrosion fluid above the cement. In some embodiments, for example, the anti-corrosion fluid may have a viscosity of less than 2 centipoise (cP), such as in the range from about 0.8 to about 1.2 cP, while the cement may have a viscosity in the range from 5 cP to about 600 cP, when measured at 20° C.

Overall, the combination of low miscibility, greater cement density, and/or greater cement viscosity may cause the anti-corrosion fluid to float on the cement in one or more embodiments.

Figure 5A:
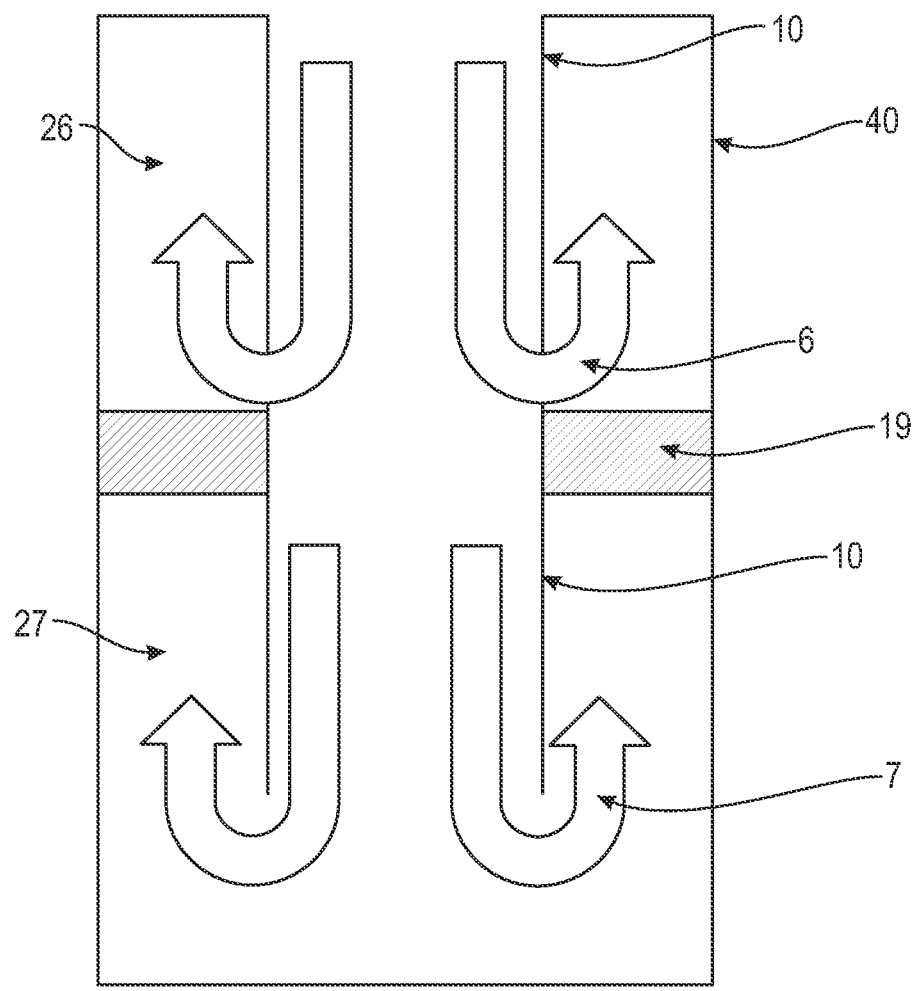
FIGS. 5A-5C depict embodiments of this disclosure that employ a multi-stage tool.

One or more embodiments may also be deployed in a system that includes one or more multi-stage tools. Multiple-stage cementing tools allow for selected intervals around the casing to be cemented at separate times or in stages. FIG. 5A depicts a cross section of a casing 10 within an outer casing 40 having a multi-stage tool 19 or a stage cementing collar, prior to any cementing operation according to an embodiment of this disclosure. The annular space between casing 10 and outer casing 40 depicted here is divided into an upper annular space 26 above multi-stage tool 19 and a lower annular space 27 below multi-stage tool 19. A first set of arrows depict upper fluid flow 6 into upper annular space 26 through openings in the casing 10, such as through a stage cementing collar that has been opened via an opening plug, for example. A second pair of arrows depicts lower fluid flow 7 into lower annular space 27 through the outlet of casing 10.

Figure 5B:
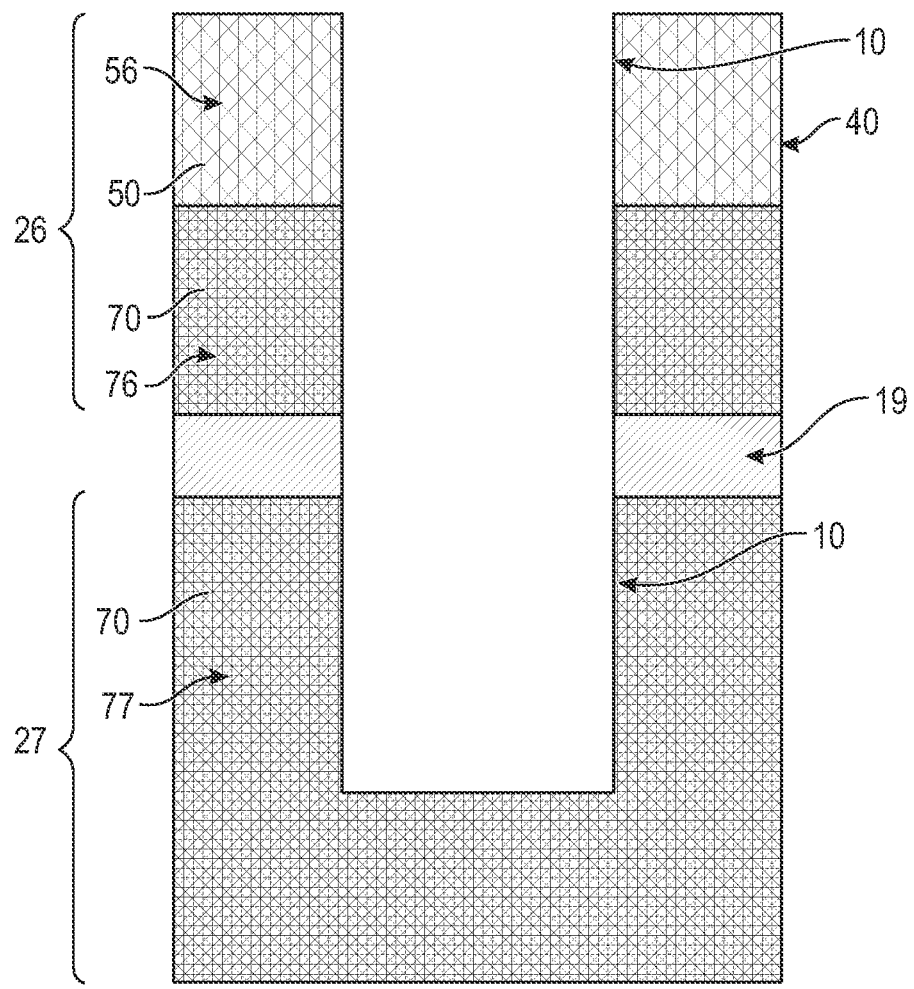

FIG. 5B depicts the cross section of FIG. 5A after pumping both anti-corrosion fluid 50 and cement 70 into casing 10 according to an embodiment of this disclosure. FIG. 5B depicts anti-corrosion fluid 50 contained only within upper annular space 26 and not within lower annular space 27. Above multi-stage tool 19 in the upper annular space 26, anti-corrosion fluid 50 forms an upper anti-corrosion fluid annular space 56 disposed above an upper cemented annular space 76. However, below multi-stage tool 19, lower annular space 27 is cemented to form a lower cemented annular space 77 without anti-corrosion fluid 50 floating above it.

The embodiment depicted in FIG. 5B includes anti-corrosion fluid 50 only above multi-stage tool 19 and not below multi-stage tool 19. However, one or more embodiments of this disclosure may have anti-corrosion fluid 50 only in lower annular space 27 and not within upper annular space 26. Furthermore, in one or more embodiments, one having skill in the art will appreciate that upper annular space 26 and/or lower annular space 27 may be essentially filled with anti-corrosion fluid 50.

Figure 5C:
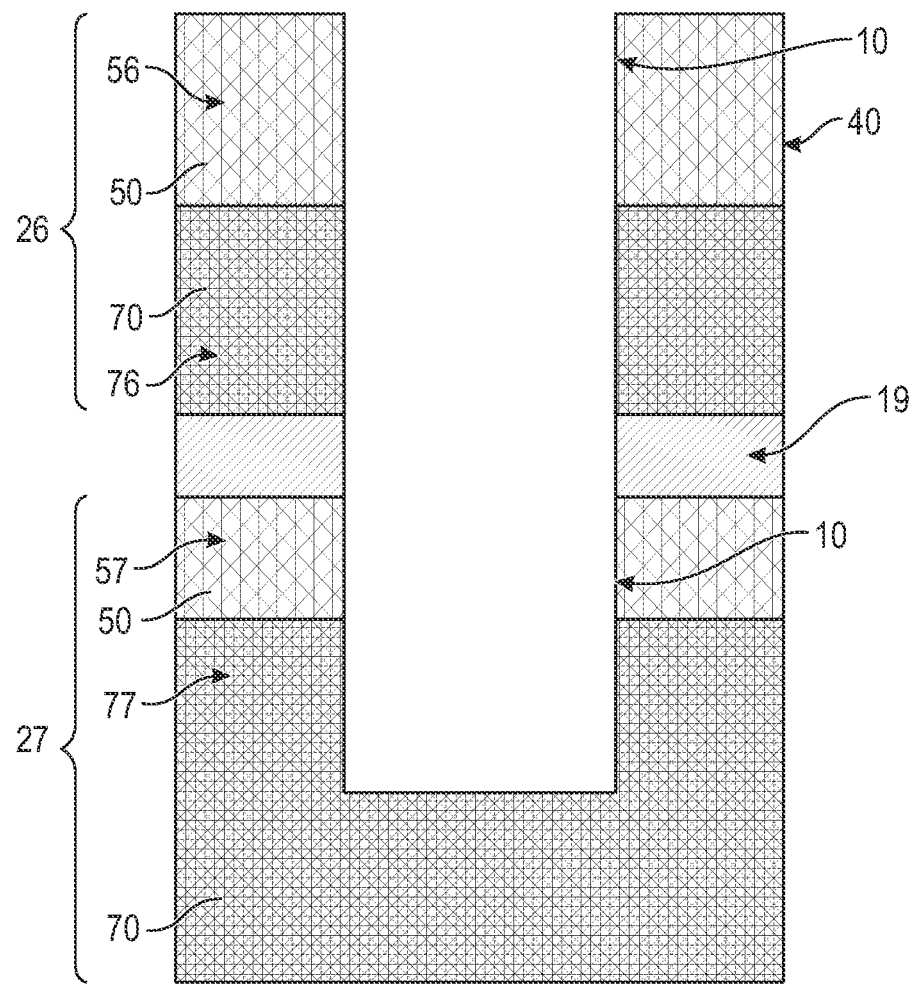

FIG. 5C again depicts the cross section of FIG. 5A after pumping anti-corrosion fluid 50 and cement 70 into casing 10 according to an embodiment of this disclosure. FIG. 5C depicts anti-corrosion fluid 50 and cement 70 contained within both upper annular space 26 and lower annular space 27. Above multi-stage tool 19 in upper annular space 26, anti-corrosion fluid 50 forms an upper anti-corrosion fluid annular space 56 that is disposed above an upper cemented annular space 76. Similarly, below multi-stage tool 19, anti-corrosion fluid 50 forms a lower anti-corrosion fluid annular space 57 that is disposed above a lower cemented annular space 77. Thus, both upper and lower annular spaces 26, 27 contain both anti-corrosive fluid 50 sitting above cement 70.

The methods for using multi-stage tools to fill different annular spaces with cements is well known in the art. Thus, one having skill in the art will appreciate the method by which these existing tools may be employed to form the structures depicted in FIGS. 5B and 5C. Furthermore, given the benefit of this disclosure, one of skill in the art will further understand how two or more multi-stage tools/stage cementing collars may be employed to direct cement 70 and/or anti-corrosion fluid 50 as desired into multiple annular spaces along the length of the wellbore.

Accordingly, in some embodiments, there may be more than one cemented annular space 76, 77 and/or more than one anti-corrosion fluid annular space 56, 57 along the entire height of casing 10 ($h_c$). Thus, one may calculate a cumulative height of the cemented annular spaces ($h_{CAS,cum}$) and a cumulative height of the anti-corrosion fluid annular spaces ($h_{AFAS,cum}$). One may then compare those cumulative heights with the height of the casing. As above, the height of the casing, the cumulative height of the cemented annular spaces, and the cumulative height of the anti-corrosion fluid annular spaces are understood to mean an axial length measured along the wellbore, to include vertical, horizontal, and angled runs. In one or more embodiments, the cumulative height of the cemented annular spaces may be between about 60% and about 90% of the height of the casing. Additionally, the cumulative height of the anti-corrosion fluid annular spaces may be between about 10% and about 40% of the height of the casing. Mathematically, these relationships may be written: $0.6*h_C \leq h_{CAS,cum} \leq 0.9*h_C$ and $0.1*h_C \leq h_{AFAS,cum} \leq 0.4*h_C$.

As discussed above, in one or more embodiments, there may be more than one cemented annular space 76, 77 and/or more than one anti-corrosion fluid annular space 56, 57 along the entire height of casing 10. Thus, a cumulative volume of the cemented annular spaces ($V_{CAS,\ cum}$) and a cumulative volume of the anti-corrosion fluid annular spaces ($V_{AFAS,\ cum}$) may be calculated. Furthermore, the cumulative volume of the cemented annular spaces may be roughly equal to a cumulative volume of cement pumped in. Similarly, the cumulative volume of anti-corrosion fluid may be roughly equal to a cumulative volume of anti-corrosion fluid pumped in. In one or more embodiments, the cumulative volume of the cemented annular spaces may be between about 60% and about 90% of the volume of the annular space; and the cumulative volume of the anti-corrosion fluid annular space may be between about 10% and about 40% of the volume of the annular space. Mathematically, these relationships may be written: $0.6*V_{AS} \leq V_{CAS,cum} \leq 0.9*V_{AS}$ and $0.1*V_{AS} \leq V_{AFAS,cum} \leq 0.4*V_{AS}$.

The annular spaces 26, 27 in the embodiments depicted in FIGS. 5A-5C are disposed between casing 10 and outer casing 40. Alternatively, in one or more embodiments having one or more multi-stage tools 19, annular spaces 26, 27 may be disposed between casing 10 and a borehole as depicted and described above. Furthermore, annular spaces 26, 27 may be within outer casing 40 at some heights and within a borehole at other heights along casing 10.

More than one multi-stage tool 19 may be employed in one or more embodiments of this disclosure. One having skill in the art will appreciate how to apply the method to form a device with one or more than one multi-stage tool.

Some embodiments of this disclosure may further include one or more casing shoes at the bottoms of the casings. A person having skill in the art may readily incorporate such a component into the device and method of this disclosure.

In some embodiments, after a cement 70 hardens to form a partially cemented annular space, an anti-corrosion fluid 50 may be retained in annular space 25. This anti-corrosion fluid 50 within annular space 25 forms anti-corrosion fluid annular space 55 above cemented annular space 75. Anti-corrosion fluid 50 may be retained in annular space 25 (i.e., between casing 10 and outer casing 40/borehole 30) indefinitely.

As described above, embodiments herein provide for casing to be partially cemented while still protecting the length of casing from corrosion. Advantageously, having un-cemented casing may allow workover operations to do casing punching and injecting of remedial fluids or slurries, such as cement or resins, at any time workover is required. By placing anti-corrosion fluid in one or more portions of the annular region, the casing is protected against corrosion, and the ability to access the formation or areas surrounding the casing proximate the un-cemented regions is enhanced.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for cementing a wellbore, the method comprising:
   pumping a volume of an anti-corrosion fluid that is a liquid comprising at least one corrosion inhibitor into a casing;
   displacing the anti-corrosion fluid into an annular space outside the casing with a volume of cement; and
   inserting a displacement fluid into the casing to displace the cement into the annular space,
      wherein a volume of cement in the annular space fills the annular space along a height of the casing, forming at least one cemented annular space with a cumulative height of the cemented annular space from about 60% to about 90% of the height of the casing,
      wherein a volume of anti-corrosion fluid in the annular space fills the annular space along a height of the casing, forming at least one anti-corrosion fluid filled annular space with a cumulative height of the anti-corrosion fluid filled annular space from about 10% to about 40% of the height of the casing,
      wherein the anti-corrosion fluid that is a liquid is retained in the annular space axially above the cemented annular space, and
      wherein the at least one corrosion inhibitor comprises one or more selected from the group consisting of one or more polyethylene polyamine, pyridine derivative, triazole derivative, Schiff base, indazole, thiadiazole derivative, thiazole derivative, thiourea derivative, oxazol derivative, phthalimide, and plant extract.

2. The method of claim 1, wherein no spacer fluids are pumped into the wellbore intermediate the anti-corrosion fluid and the cement.

3. The method of claim 1, further comprising hardening the cement within the annular space.

4. The method of claim 3, wherein the at least one cemented annular space is not continuous in an axial direction within the borehole.

5. The method of claim 4, wherein the cumulative height of the at least one cemented annular space plus a cumulative height of at least one anti-corrosion fluid annular space is equivalent to the height of the casing.

6. The method of claim 1, wherein a density of the anti-corrosion fluid is less than a density of the cement.

7. The method of claim 6, wherein the cement has a density at least 10 pounds per cubic foot greater than the anti-corrosion fluid.

8. The method of claim 1, wherein the cement and the anti-corrosion fluid are immiscible.

9. The method of claim 1, wherein the annular space is disposed between the casing and a borehole.

10. The method of claim 1, wherein
    the casing is disposed radially within an outer casing,
    a diameter of the outer casing is greater than a diameter of the casing, and
    the annular space is disposed between the casing and the outer casing.

11. The method of claim 1, further comprising forming punched casing via punching the casing, wherein the punching is performed at an axial height of the wellbore where anti-corrosion fluid is retained in the annular space.

12. The method of claim 11, further comprising injecting remedial fluids into the annular space via the punched casing.

13. The method of claim 1, wherein the casing comprises one or more stage cementing collars or multi-stage cementing tools, the method comprising:
    disposing cement, anti-corrosion fluid, or both, into an annular space outside the casing via the one or more stage cementing collars or multi-stage cementing tools.

14. A well system comprising a partially cemented casing formed by the method of claim 13, wherein the annular space outside the casing comprises multiple zones comprising cement and multiple zones comprising anti-corrosion fluid.

15. A well system comprising a partially cemented casing formed by the method of claim 1.

16. The well system according to claim 15, wherein a cumulative height of a cemented annular space plus a cumulative height of an anti-corrosion fluid annular space is equivalent to a height of a casing.

17. The method of claim 1, wherein the at least one corrosion inhibitor consists of a triamine.

18. A method of cementing a wellbore, comprising:
    pumping a volume of an anti-corrosion fluid that is a liquid comprising at least one corrosion inhibitor into a casing;

displacing the anti-corrosion fluid into an annular space between the casing and a wellbore with a volume of cement; and pumping a displacement fluid into the casing to displace the cement into the annular space;

wherein, following hardening of the cement, a first section of the annular space outside the casing contains a volume of the anti-corrosion fluid and a second section of the annular space outside the casing contains the cement, wherein a volume of anti-corrosion fluid in the first section fills the annular space along a height of the casing, forming at least one anti-corrosion fluid filled annular space with a cumulative height of the anti-corrosion fluid filled annular space from about 10% to about 40% of the height of the casing, wherein a volume of cement in the second section fills the annular space along a height of the casing, forming at least one cemented annular space with a cumulative height of the cemented annular space from about 60% to about 90% of the height of the casing, wherein the anti-corrosion fluid that is a liquid is retained in the annular space axially above the cemented annular space, and wherein the at least one corrosion inhibitor comprises one or more selected from the group consisting of polyethylene polyamine, triethanolamine, pyridine derivative, triazole derivative, Schiff base, indazole, thiadiazole derivative, thiazole derivative, thiourea derivative, oxazol derivative, phthalimide, and plant extract.

19. The method of claim 18, wherein the at least one corrosion inhibitor consists of a triamine.

* * * * *